(12) United States Patent
Zhao et al.

(10) Patent No.: US 8,411,909 B1
(45) Date of Patent: Apr. 2, 2013

(54) FACIAL RECOGNITION

(75) Inventors: Yong Zhao, San Jose, CA (US); Henry Will Schneiderman, Pittsburgh, PA (US); Michael Andrew Sipe, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/533,723

(22) Filed: Jun. 26, 2012

(51) Int. Cl.
*G06K 9/00* (2006.01)
(52) U.S. Cl. .................................... 382/116
(58) Field of Classification Search .......... 382/115–118, 382/218
See application file for complete search history.

(56) References Cited

U.S. PATENT DOCUMENTS

| | | | |
|---|---|---|---|
| 6,801,640 B1 * | 10/2004 | Okubo et al. | 382/118 |
| 6,829,384 B2 | 12/2004 | Schneiderman et al. | |
| 6,947,579 B2 | 9/2005 | Bronstein et al. | |
| 7,127,087 B2 | 10/2006 | Huang et al. | |
| 7,194,114 B2 | 3/2007 | Schneiderman | |
| 7,421,097 B2 | 9/2008 | Hamza et al. | |
| 7,755,619 B2 | 7/2010 | Wang et al. | |
| 7,848,566 B2 | 12/2010 | Schneiderman | |
| 7,986,816 B1 * | 7/2011 | Hoanca et al. | 382/115 |
| 8,064,688 B2 | 11/2011 | Schneiderman | |
| 2005/0212654 A1 * | 9/2005 | Yoda | 340/5.53 |
| 2006/0026427 A1 * | 2/2006 | Jefferson | 713/170 |
| 2007/0291998 A1 | 12/2007 | Takizawa et al. | |
| 2009/0067681 A1 | 3/2009 | Michaeli | |
| 2010/0074479 A1 | 3/2010 | Chou et al. | |
| 2010/0135541 A1 | 6/2010 | Lai et al. | |
| 2010/0246906 A1 | 9/2010 | Lovell et al. | |
| 2010/0310133 A1 * | 12/2010 | Mason et al. | 382/117 |

FOREIGN PATENT DOCUMENTS

| | | |
|---|---|---|
| KR | 20040048753 A | 6/2004 |
| WO | 2010043771 A1 | 4/2010 |
| WO | 2011042601 A1 | 4/2011 |

OTHER PUBLICATIONS

U.S. Appl. No. 13/524,745, by Michael Christian Nechyba, filed Jun. 15, 2012.
Brian, "Can Android's new Face Unlock feature be hacked using a photo? Google says no," The next Web, retrieved at http://thenextweb.com/google/2011/10/20/can-androids-new-face-unlock-feature-be-hacked-using-a-photo-google-says-no/, Oct. 20, 2011, 2 pp.
Visidon, "Face Recognition," retrieved from http://www.visidon.fi/en/Face_Recognition, accessed on May 18, 2012, 1 pp.
U.S. Appl. No. 13/533,682, by Steven James Ross, filed Jun. 26, 2012.
U.S. Appl. No. 13/533,811, by Michael Sipe, filed Jun. 26, 2012.
U.S. Appl. No. 13/533,834, by Michael Nechyba, filed Jun. 26, 2012.

* cited by examiner

*Primary Examiner* — Daniel Mariam
(74) *Attorney, Agent, or Firm* — Shumaker & Sieffert, P.A.

(57) ABSTRACT

An example method includes initiating an emission, by a computing device, of at least one light beam, receiving, from an image capture device of the computing device, an image of a face of a user, and identifying at least one representation of an eye of the user in the image. The method further includes determining, by the computing device, whether at least one reflection of light from the light beam is associated with a cornea of the representation of the eye of the user in the image. The method further includes determining, based at least in part on the first determination, whether to deny authentication of the user with respect to accessing one or more functionalities controlled by the computing device, wherein the authentication is denied independent of performing facial recognition based at least in part on the image.

30 Claims, 6 Drawing Sheets

FACIAL RECOGNITION

TECHNICAL FIELD

This disclosure relates to facial recognition technology.

BACKGROUND

A user may activate or otherwise gain access to functionalities controlled by a computing device by "unlocking" the device. In some instances, a computing device may be configured to permit unlocking based on authentication information provided by the user. Authentication information may take various forms, including alphanumeric passcodes and biometric information. Examples of biometric information include fingerprints, retina scans, and facial images. A computing device may authenticate a facial image input using facial recognition technology.

SUMMARY

In one example, a method includes initiating an emission, by a computing device, of at least one light beam, receiving, from an image capture device coupled to the computing device, an image of a face of a user, and identifying at least one representation of an eye of the user in the image. The method further includes determining, by the computing device, whether at least one reflection of light from the light beam is associated with a cornea of the representation of the eye of the user in the image. The method further includes determining, based at least in part on whether the at least one reflection of light from the light beam is associated with a cornea of the representation of the eye of the user in the image, whether to deny authentication of the user with respect to accessing one or more functionalities controlled by the computing device, wherein the authentication is denied independent of performing facial recognition based at least in part on the image.

In another example, a computer-readable medium includes instructions for causing a programmable processor of a computing device to perform operations. The operations include initiating an emission of at least one light beam, receiving, from an image capture device coupled to the computing device, an image of a face of a user, and identifying at least one representation of an eye of the user in the image. The operations further include detecting whether at least one reflection of light associated with the light beam associated with a cornea of the at least one representation of the eye exists in the image, and determining, based at least in part on the detecting, whether to deny authentication of the user with respect to accessing one or more functionalities controlled by the computing device, wherein the authentication is denied independent of performing facial recognition based at least in part on the image.

In another example, a device includes a at least one processor, at least one image capture device operable to capture an image of a face of a user, and a glint detection module operable to identify at least one representation of an eye of the user in the image, and determine whether at least one reflection of light from the light beam is associated with a cornea of the representation of the eye of the user in the image. The device further includes a facial recognition module operable to determine whether to deny authentication of the user with respect to accessing one or more functionalities controlled by the computing device, wherein the authentication is denied independent of performing facial recognition based at least in part on the image.

DETAILED DESCRIPTION

Figure 1A:
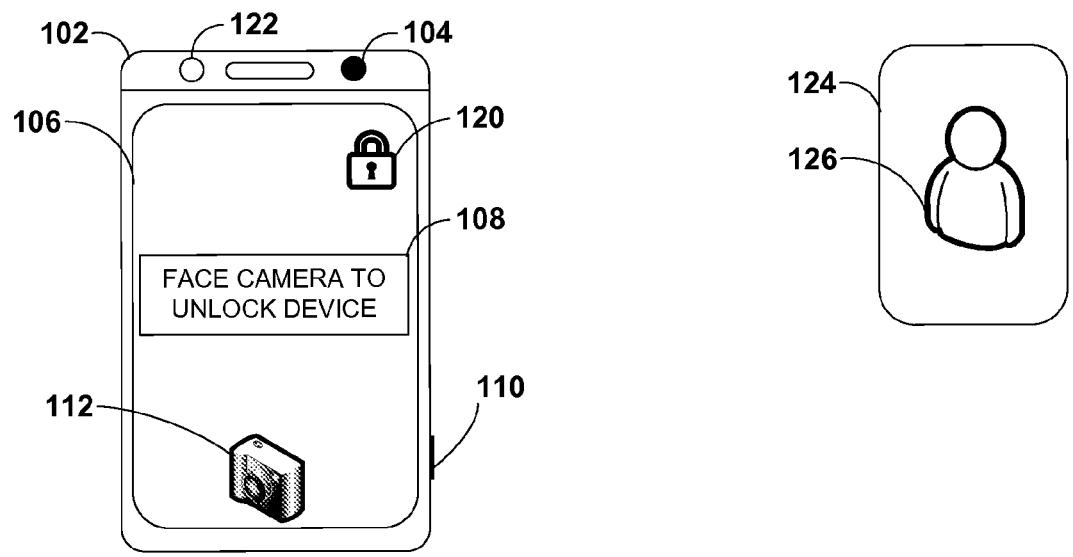
FIGS. 1A-1B are conceptual diagrams illustrating an example computing device for detecting possible spoofing in captured facial images, in accordance with one or more aspects of the present disclosure.

A computing device may use facial recognition programs in various scenarios. For example, a computing device may use facial recognition programs to authenticate a user who attempts to gain access to one or more functionalities of the computing device or functionalities otherwise controlled by the computing device. In some common scenarios, a computing device may store images of the faces of one or more authorized users (or "enrollment images"). When a user attempts to gain access to functionalities of (or "unlock") the computing device, the computing device may capture an image of the user's face for authentication purposes. The computing device may then use facial recognition programs to compare the captured facial image to the enrollment images associated with authorized users. If the facial recognition programs determine an acceptable level of match between the captured facial image and at least one enrollment image, the computing device may authenticate the user, and grant the unlock request.

Unauthorized users may leverage vulnerabilities of facial recognition programs to cause erroneous authentication. For example, an unauthorized user may attempt to unlock a computing device using "spoofing" techniques. To cause erroneous authentication by spoofing, an unauthorized user may present a facial image of an authorized user for capture by the computing device. For example, an unauthorized user may present to the device a printed picture of the authorized user's face or obtain a video or digital image of an authorized user on a second computing device (e.g., by pulling up an authorized user's profile picture from a social networking website). Thus, an unauthorized user may attempt to use spoofing methods to gain access to functionalities of the computing device to overcome authentication constraints otherwise implemented by the computing device.

In general, the present disclosure is directed to techniques for preventing erroneous authentication caused by spoofing. A computing device may implement one or more anti-spoofing programs that detect suspected attempts to spoof, and prevent erroneous authentication due to spoofing. In some examples, the anti-spoofing techniques may be performed by programs that cause one or more hardware components of the computing device to emit light in the direction of the object of the captured facial image. The anti-spoofing programs may then identify one or more landmarks within the captured facial image, and analyze the landmarks for possible signs of spoofing. For example, the anti-spoofing programs may identify one or both eyes of the facial image as landmarks. The anti-spoofing programs may then analyze the image to detect for a presence of any reflection of the emitted light from the eyes, such as corneal glint. Based on the analysis, the anti-spoofing programs may transition the computing device from a locked state to an unlocked state when the expected glint is detected, or prevent access to the computing device when the expected glint is not detected.

The anti-spoofing programs described herein may provide one or more advantages, such as reduced chances of an unauthorized user causing erroneous authentication by spoofing. For example, the anti-spoofing programs may cause the facial recognition programs to deny authentication to a user when the analyzed images of the landmarks do not include a reflection of the emitted light at all, or when an intensity of the reflected light in the images is below a threshold intensity. In another example, the anti-spoofing programs may cause the computing device to capture two or more facial images while emitting varying intensities of light, and cause the facial recognition programs to deny authentication if the landmarks do not reflect sufficiently varying intensities of light from one facial image to another. In yet another example, the anti-spoofing programs may cause the facial recognition programs to deny authentication to a user if the image analysis indicates that the light reflected from the landmarks does not sufficiently match an expected frequency content of the emitted light. For example, a computing device may emit light beams having different colors, or frequencies, that are expected to induce in the eyes of a user a reflection of light having a corresponding frequency content. In this manner, techniques of the present disclosure may reduce the occurrence of erroneous authentication caused by spoofing. In addition, the anti-spoofing programs may reduce the usage of the facial recognition programs, thus conserving computing resources and reducing power consumption (e.g., extending battery life in mobile computing devices).

Figure 1B:
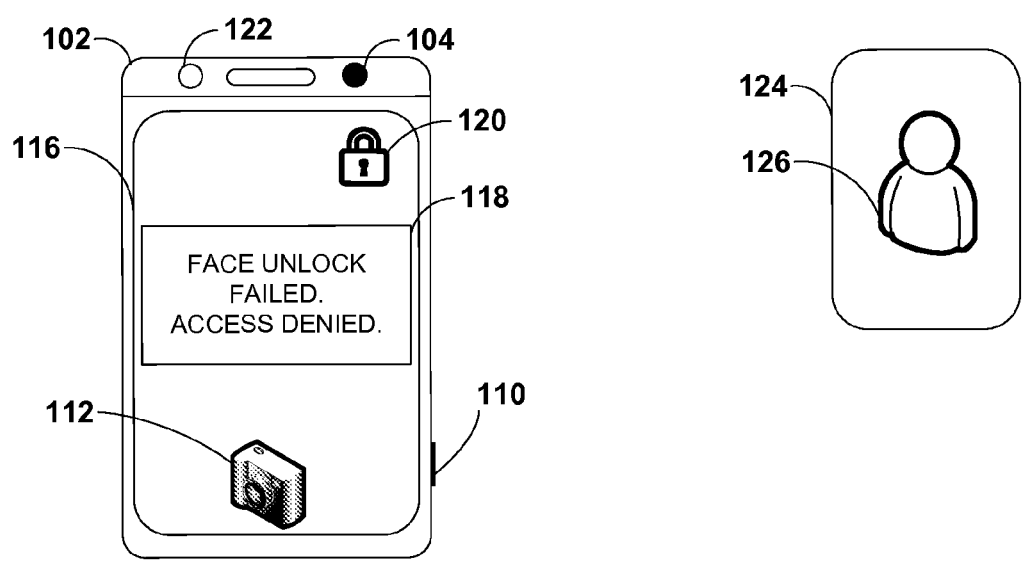

FIGS. 1A-1B are conceptual diagrams illustrating an example computing device for detecting possible spoofing in captured facial images, in accordance with one or more aspects of the present disclosure. FIG. 1A illustrates computing device 102 that may capture facial images associated with a user (e.g., authorized user 126), analyze the captured facial image for possible spoofing, and determine whether to allow or deny authentication based on the analysis. Computing device 102 may include, be, or be part of one or more of a variety of types of devices, such as a mobile phone (including a smartphone), tablet computer, netbook, laptop, desktop, personal digital assistant ("PDA"), set-top box, television, biometric door lock, watch, vehicle ignition, and presence verification device, among others.

Computing device 102 may include camera lens 104 and flashbulb 122. In the example of FIG. 1A, both camera lens 104 and flashbulb 122 may be part of or coupled to a front-facing camera of computing device 102. In other examples, one or both of camera lens 104 and flashbulb 122 may be part of or coupled to a rear-facing camera of computing device 102. One or both of the front-facing and rear-facing cameras may be capable of capturing still images, video, or both. In still other examples, camera lens 104 and flashbulb 122 may be integrated to form a single component of computing device 102.

In the example of FIG. 1A, computing device 102 may include a display device that displays graphical user interface (GUI) 106. GUI 106 may be displayed by a variety of display devices, including input/output capable devices such as a touchscreen or presence-sensitive display. As shown in the example of FIG. 1A, GUI 106 may include one or more GUI elements, such as lock indicator 120, unlock prompt 108, and capture icon 112.

Computing device 102 may be configured to operate in a "locked" mode, shown by lock indicator 120. In some examples, a user may actively configure computing device 102 to operate in locked mode. For example, a user may press a button (such as button 110) for a predetermined length of time to configure computing device 102 to operate in locked mode. In these and other examples, a user may tap, swipe, or otherwise interact with one or more elements of GUI 106, using an input/output capable display of computing device 102. Computing device 102 may also be configured to operate in locked mode by passive means. For example, a predetermined period of "inactivity" may configure computing device 102 to operate in locked mode. Inactivity may occur due to an absence of user interaction (e.g., through button presses, contact with an input/output capable display device, etc.). The predetermined time period that configures computing device 102 to operate in locked mode may be a default time period specified by a manufacturer of computing device 102, or may be programmed by an authorized user, such as authorized user 126.

In some examples, computing device 102 may utilize facial recognition technology to stop operation in locked mode. In other words, authorized user 126 may "unlock" computing device 102 by authentication methods that use facial recognition techniques to determine whether authorized user 126 is an authorized user of device 102. More specifically, authorized user 126 may set up a facial recognition application or embedded process of computing device 102 by storing an enrollment image that represents the face of authorized user 126. Authorized user 126 may cause a camera of computing device 102 to capture the authentication using camera lens 104. Computing device 102 may store the enrollment image to one or more storage devices of computing device 102, and/or to a remote location, commonly known as "cloud storage."

To unlock computing device 102 using facial recognition technology, a user (such as authorized user 126) may provide an authentication image that represents at least a portion of his/her face. In some examples, the user may actively cause a camera of computing device 102 to capture the authentication image. For example, the user may face camera lens 104 and press button 110 to cause the camera to capture the authentication image. In another example, the user may tap, swipe, or otherwise interact with an area associated with capture icon 112 included in GUI 106. In still other examples, computing device 102 may automatically capture the authentication image in response to the user facing camera lens 104. As shown in the example of FIG. 1A, computing device 102 may display GUI 106 to include unlock prompt 108. In this example, unlock prompt 108 indicates that the user may simply face a camera, which may include or be otherwise coupled to camera lens 104, to cause computing device 102 to capture the authentication image. For example, when the user faces camera lens 104, computing device 102 may use a facial recognition program to determine that the image currently captured through camera lens 104 includes a representation of a human face.

Computing device 102 may then compare the captured authentication image with the enrollment image, and determine whether or not the images are sufficiently similar to each other for facial recognition purposes. For example, computing device 102 may utilize one or more facial recognition programs to compare metrics associated with the authentication image to metrics associated with the enrollment image. Some examples of metrics may include distances between facial elements (pupil-to-pupil, mouth width, etc.), contours of various facial features, pixilation corresponding to skin tone or texture, hair and/or eye color, and many others. Facial recognition programs running on computing device 102 may perform the comparison using one or more recognition algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, to name just a few. Based on comparison-based values, such as preprogrammed acceptable margins of error, facial recognition programs running on computing device 102 may determine whether or not the authentication image and the enrollment image are sufficiently similar to one another for facial recognition. In instances where the facial recognition programs grant a match, the user may successfully unlock computing device 102. Conversely, if the facial recognition programs deny a match, the user may be unable to unlock computing device 102, and computing device 102 may continue to operate in locked mode.

However, an unauthorized user may exploit vulnerabilities of commonly used facial recognition technologies to gain access to unlock computing device 102. For example, if an unauthorized user gains possession of computing device 102 while computing device 102 is configured in locked mode, the unauthorized user may attempt to unlock computing device 102, as solicited by unlock prompt 108. To successfully authenticate, the unauthorized user may spoof one or more facial recognition programs running on computing device 102 by presenting image 124, which includes a visual representation of authorized user 126. Image 124 may take various forms, such as a still photo in printed form, still photo in digital form, or one or more frames of a video. In one example where image 124 is a digital still photo, the unauthorized user may invoke image 124 using a second computing device (not shown for purposes of ease of illustration). For example, the unauthorized user may use the Internet to access a profile picture that authorized user 126 posted to a social networking website. Using image 124, an unauthorized user may attempt to spoof the facial recognition programs running on computing device 102 and illicitly unlock computing device 102.

Computing device 102 may implement techniques of this disclosure to detect attempts to spoof the facial recognition programs using image 124. In many cases, a legitimate facial image (i.e., captured from an actual human face, rather than a reproduced image) will include a glint in one or both eyes. More specifically, a legitimate facial image may display a glint in the cornea (front-facing portion) of one or both eyes. In some instances, computing device 102 may use a flashbulb to induce corneal glint in a legitimate facial image. In cases where an unauthorized user attempts to spoof the facial recognition programs running on computing device 102 (e.g., using image 124), the captured facial image may include diminished or no corneal glint, or, in the case of image 124 being a video representation of the user, the timing of the appearance of corneal glint may correspond to an expected timing based on the timing of the flashbulb. Computing device 102 may implement techniques of this disclosure to determine whether or not a captured facial image includes appropriate corneal glint to constitute a legitimate facial image. If computing device 102 determines that a captured facial image does not include appropriate corneal glint, computing device 102 may detect a spoofing attempt, and denying authentication of the user prior to even performing facial recognition techniques. In this manner, computing device 102 may implement techniques of this disclosure to prevent erroneous authentication by spoofing.

FIG. 1B is a conceptual diagram illustrating the behavior of computing device 102 after computing device 102 detects an attempt to cause erroneous authentication by spoofing. As discussed, an unauthorized user may attempt to spoof facial recognition programs running on computing device 102 using image 124 that represents authorized user 126. Computing device 102 may implement one or more techniques of this disclosure to detect an attempt to spoof, and deny authentication by facial recognition based on the detection. As shown in FIG. 1B, computing device 102 may display failure notification 118 within modified GUI 116. In this example, failure notification 118 merely indicates that an attempt to authenticate by facial recognition failed, and that computing device 102 has denied access to a user who attempted to unlock computing device 102 using image 124. In other examples, computing device 102 may display a more detailed notification, e.g. a notification that identifies spoofing as a suspected reason behind the failure to authenticate.

As discussed, a legitimate facial image may include an indication of corneal glint. Computing device 102 may use flashbulb 122 or a temporarily brightened display to induce the corneal glint, natural and/or artificial light from a user's surroundings may cause the corneal glint, or any combination thereof. In other implementations, computing device 102 may use light sources other than flashbulb 122 to induce corneal glint. Computing device 102 may use these other light sources either in place of, or in addition to flashbulb 122. Examples of other light sources include an infrared emitter (such as those used in infrared proximity sensors), light emitting diodes (such as those used in LED-based proximity sensors), and display device(s) of computing device 102. As discussed, computing device 102 may temporarily brighten a display device, such as a touchscreen of a smartphone, in order to induce the corneal glint. Additionally, computing device 102 may emit light that is of sufficient brightness to induce corneal glint, but not so bright as to overexpose or "wash out" the authentication image.

In some examples, computing device 102 may vary the brightness of the emitted light based on ambient light in the surroundings of the subject of the authentication image, a technique known as adaptive brightness adjustment. To accomplish adaptive brightness adjustment, computing device may be equipped with a dedicated ambient light sensor. Using the dedicated ambient light sensor, computing device 102 may discern a brightness of the surroundings of the subject of the authentication image. Based on the discerned brightness, computing device 102 may vary the brightness of the light beam(s) emitted by flashbulb 122 and/or the other light sources described above.

In some implementations, computing device 102 may use a technique known as "time modulation" to enhance robustness of the anti-spoofing techniques described herein. To implement time modulation, computing device 102 may initiate emissions of multiple light beams using flashbulb 122 and/or other light sources. Computing device 102 may cause flashbulb 122 to emit the multiple light beams, at predetermined and/or randomly generated time intervals. Computing device 102 may then capture authentication images associated with some or all of the multiple emitted light beams, and check for corneal glint in each captured authentication image. If computing device 102 does not detect sufficient glint in a certain number of the captured images (e.g., all of the captured images, or a threshold number within the total number of images), computing device 102 may deny authentication of the user based on detected spoofing. In this manner, techniques of this disclosure may incorporate time modulation to enhance and add robustness to the anti-spoofing measures described herein.

To determine whether a captured facial image is legitimate or spoof-based, computing device 102 may detect corneal glint in the captured facial image and/or analyze the corneal glint. In one example, computing device 102 may use flashbulb 122 to initiate an emission of a light beam, commonly known as a "flash." Under conditions such as dim lighting, the flash may induce a corneal glint that is present in a legitimate facial image, where the corneal glint might otherwise be absent or diminished. Computing device 102 may then determine whether the captured facial image includes sufficient corneal glint to constitute a legitimate facial image. In various situations, the corneal glint may include, or be entirely, a reflection of the flash.

Computing device 102 may detect and analyze the corneal glint in a variety of ways. In one example, computing device 102 may measure or estimate the intensity of reflection that causes the corneal glint. The intensity may derived from and/or directly proportional to optical measurements such as luminance, luminosity, luminous intensity, illuminance, luminous emittance, radiant intensity, irradiance, radiance, and others. Computing device 102 may then compare the intensity to a threshold intensity associated with one or more known legitimate facial images. If the intensity of the captured corneal glint is less than the threshold intensity, computing device 102 may recognize the captured facial image to be spoof-based, and decline to evaluate the captured facial image for facial recognition-based authentication.

Figure 2:
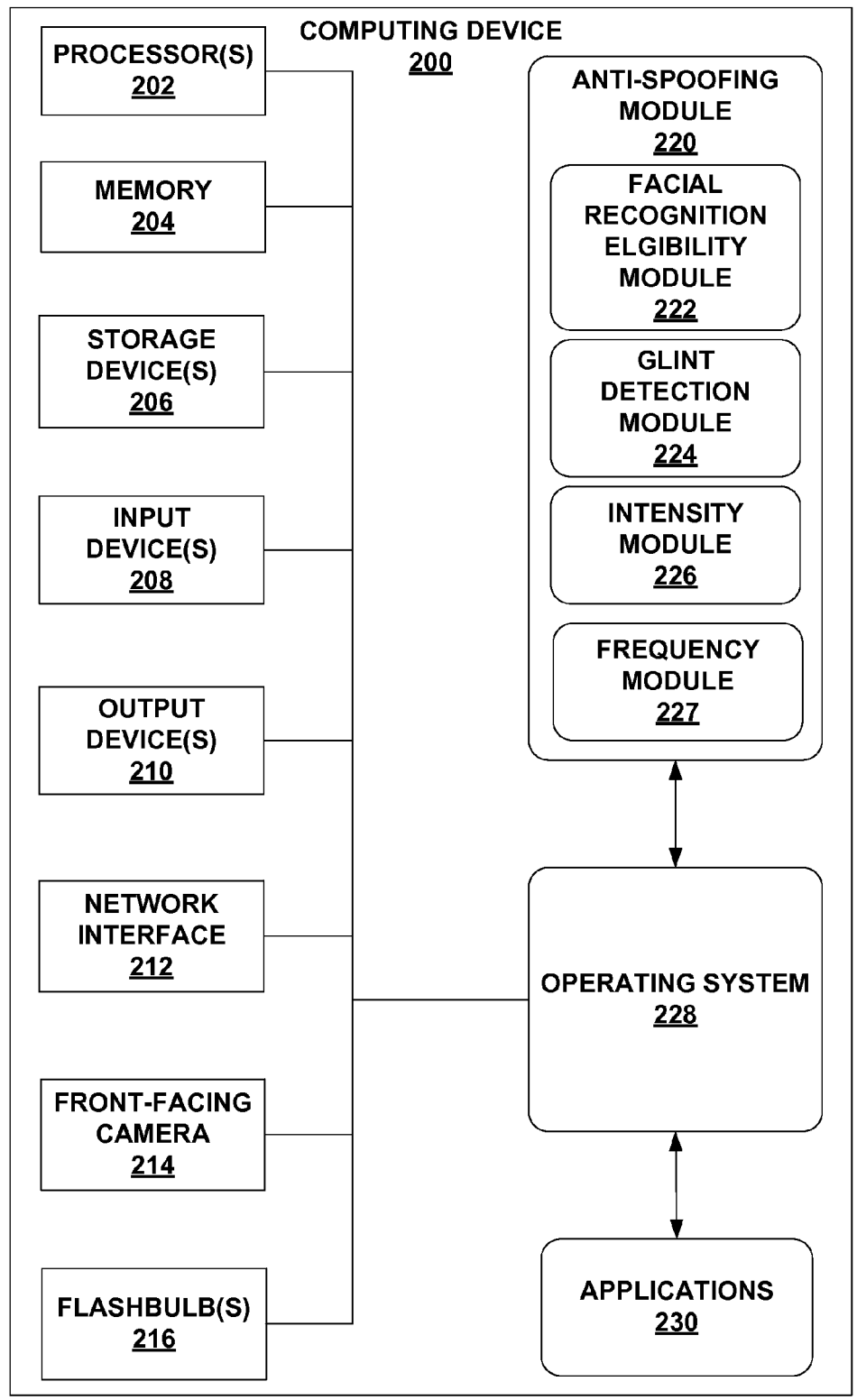
FIG. 2 is a block diagram illustrating details of an example computing device for detecting possible spoofing in captured facial images, in accordance with one or more aspects of this disclosure.

FIG. 2 is a block diagram illustrating details of an example computing device for detecting possible spoofing in captured facial images, in accordance with one or more aspects of this disclosure. Computing device 200 may be one non-limiting example of computing device 102 of FIGS. 1A-1B. As shown in the example of FIG. 2, computing device 200 includes one or more processors 202, memory 204, one or more storage devices 206, one or more input devices 208, one or more output devices 210, network interface 212, front-facing camera 214, and one or more flashbulbs 216. One or more processors 202 are, in some examples, configured to implement functionality and/or process instructions for execution within computing device 200. For example, processors 202 may process instructions stored in memory 204 and/or instructions stored on storage devices 206. Such instructions may include components of operating system 228, anti-spoofing module 220, facial recognition eligibility module 222, glint detection module 224, intensity module 226, frequency module 227, and one or more applications 230. Computing device 200 may also include one or more additional components not shown in FIG. 2, such as a power supply (e.g., a battery), a global positioning system (GPS) receiver, and a radio frequency identification (RFID) reader, among others.

Memory 204, in one example, is configured to store information within computing device 200 during operation. Memory 204, in some examples, is described as a computer-readable storage medium. In some examples, memory 204 is a temporary memory, meaning that a primary purpose of memory 204 may not be long-term storage. Memory 204, in some examples, is described as a volatile memory, meaning that memory 204 does not maintain stored contents when memory 204 is not receiving power. Examples of volatile memories include random access memories (RAM), dynamic random access memories (DRAM), static random access memories (SRAM), and other forms of volatile memories known in the art. In some examples, memory 204 is used to store program instructions for execution by processors 202. Memory 204, in one example, is used by software (e.g., operating system 228) or applications (e.g., one or more applications 230) executing on computing device 200 to temporarily store information during program execution.

One or more storage devices 206, in some examples, also include one or more computer-readable storage media. In some examples, storage devices 206 may be configured to store greater amounts of information than memory 204. Storage devices 206 may further be configured for long-term storage of information. In some examples, storage devices 206 include non-volatile storage elements. Examples of such non-volatile storage elements include magnetic hard discs, optical discs, solid-state discs, floppy discs, flash memories, forms of electrically programmable memories (EPROM) or electrically erasable and programmable memories, and other forms of non-volatile memories known in the art.

As shown in FIG. 2, computing device 200 may also include one or more input devices 208. One or more of input devices 208 may be configured to receive input from a user through tactile, audio, video, or biometric channels. Examples of input devices 208 may include a keyboard, mouse, touchscreen, presence-sensitive display, microphone, one or more still and/or video cameras, fingerprint reader, retina scanner, or any other device capable of detecting an input from a user or other source, and relaying the input to computing device 200, or components thereof. Though shown separately in FIG. 2, one or both of front-facing camera 214 and flashbulbs 216 may, in some instances, be part of input devices 208.

Output devices 210 of computing device 200, in some examples, may be configured to provide output to a user through visual, auditory, or tactile channels. Output devices 210 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. Output devices 210 may also include a touchscreen, presence-sensitive display, or other input/output capable displays known in the art.

Computing device 200, in some examples, also includes network interface 212. Computing device 200, in one example, utilizes network interface 212 to communicate with external devices via one or more networks, such as one or more wireless networks. Network interface 212 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB. In some examples, computing device 200 utilizes network interface 312 to wirelessly communicate with external devices over a network.

Operating system 228 may control one or more functionalities of computing device 200 and/or components thereof. For example, operating system 228 may interact with applications 230, and may facilitate one or more interactions between applications 230 and one or more of processors 202, memory 204, storage devices 206, input devices 208, and output devices 210. As shown in FIG. 2, operating system 228 may interact with or be otherwise coupled to applications 230 and anti-spoofing module 220 and components thereof. In some examples, one or more of anti-spoofing module 220, facial recognition eligibility module 222, glint detection module 224, intensity module 226, and frequency module 227 may be included in operating system 228. In these and other examples, one or more of anti-spoofing module 220, facial recognition eligibility module 222, glint detection module 224, intensity module 226, and frequency module 227 may be part of applications 230. In other examples, one or more of anti-spoofing module 220, facial recognition eligibility module 222, glint detection module 224, intensity module 226, and frequency module 227 may be implemented externally to computing device 200, such as at a network location. In some such instances, computing device 200 may use network interface 212 to access and implement functionalities provided by anti-spoofing module 220 and its components, through methods commonly known as "cloud computing."

Anti-spoofing module 220 may implement one or more of the techniques described in this disclosure. For example, anti-spoofing module 220 may analyze an authentication image captured by front-facing camera 214 for possible spoofing, and cause operating system 228 and/or one or more of applications 230 to either grant or deny a user's request to proceed with authentication based on the analysis. In various examples, anti-spoofing module 220 may utilize one or more of facial recognition eligibility module 222, glint detection module 224, intensity module 226, and frequency module 227 to analyze the authentication image.

After computing device 200 captures an authentication image (e.g., using front-facing camera 214), anti-spoofing module 220 may begin analyzing the authentication image by determining whether the authentication image includes a representation of a human face. For example, facial recognition eligibility module 222 may implement one or more of the facial recognition techniques discussed above to detect a representation of a human face in the captured image. In various other examples, anti-spoofing module 220 may itself determine whether a captured image includes a representation of a face, or one or more of glint detection module 224, intensity module 226, and frequency module 227 may be operable to determine whether a captured authentication image includes a representation of a face. By determining whether a captured authentication image includes a representation of a human face, anti-spoofing module 220 may eliminate those instances in which one or more of glint detection module 224, intensity module 226, and frequency module 227 unnecessarily assess images that are ineligible for facial recognition.

Anti-spoofing module 220 may then analyze the captured authentication image for qualities that are characteristic of spoofing. For example, glint detection module 224 may determine whether or not the authentication image includes a corneal glint. The presence of corneal glint in the authentication image may indicate that the authentication image is legitimate (e.g., that the subject of the authentication image is an actual human face). Conversely, the absence of corneal glint in the authentication image may indicate that the authentication is spoof-based (e.g., that the subject of the authentication is reproduced image of a human face). Glint detection module 224 may first identify one or both eyes (more specifically, one or both corneas) in the authentication image. Glint detection module 224 may then determine whether corneal glint exists in the eye(s). If glint detection module 224 determines that corneal glint is absent in the authentication image, glint detection module 224 may prevent one or more facial recognition programs running on computing device 200 from performing facial recognition analysis on the authentication image. In this manner, glint detection module 224 may implement techniques of this disclosure to prevent erroneous authentication caused by spoofing.

In some examples, a spoof-based authentication image may include some level of corneal glint. For example, an unauthorized user may attempt to spoof facial recognition programs by presenting a photograph of an authorized user. The photograph may itself include corneal glint, as the photograph may have been taken directly of the authorized user. In this scenario, the spoof-based authentication image may capture the corneal glint represented in the photograph. However, the corneal glint in the spoof-based authentication image may be diminished or otherwise different when compared to the expected corneal glint of a legitimate authentication image. In such situations, one or both of intensity module 226 and frequency module 227 may implement techniques of this disclosure to detect the spoofing attempt and prevent erroneous authentication.

In various implementations, intensity module 226 may measure the intensity of the corneal glint in the authentication image, and compare the measured intensity to a threshold intensity. The threshold intensity may correspond to the intensity of corneal glint in a known legitimate authentication image. If the measured intensity is less than the threshold intensity, intensity module 226 may prevent one or more facial recognition programs running on computing device 200 from performing facial recognition analysis on the authentication image.

Additionally, intensity module 226 may measure the intensity in a number of ways. In some examples, intensity module 226 may measure the intensity based on angular metrics, such as luminous intensity or radiant intensity. In other examples, intensity module 226 may measure the intensity based on areal metrics, such as irradiance, illuminance, and luminous emittance. In still other examples, intensity module 226 may measure the intensity based on a combination of angular and areal metrics, such as radiance or luminance. By measuring the intensity in two or more ways, intensity module 226 may derive a more robust measurement of the intensity before comparing the measured intensity with the threshold intensity.

In some implementations, frequency module 227 may supplement, support, or replace the functionalities performed out by intensity module 226. Frequency module 227 may be operable to measure one or more frequencies associated with the corneal glint. A frequency may manifest in the form of visible and/or invisible colors. In some examples, frequency module 227 may define an acceptable frequency range for corneal glint in a captured authentication image. The acceptable frequency range may be based on known frequencies of the respective light beams emitted by flashbulbs 216. For example, the frequency of the emitted light beam may be a median point of the acceptable frequency range. If the frequency of the corneal glint falls outside the acceptable frequency range (i.e., exceeds the upper bound or is below the lower bound of the range), frequency module 227 may prevent one or more facial recognition programs running on computing device 200 from performing facial recognition analysis on the authentication image.

Some implementations may be enhanced to improve robustness and accuracy. For example, frequency module 227 may cause flashbulbs of computing device 200 to emit two or more light beams of varying frequencies, and cause front-facing camera 214 to capture a separate authentication image associated with each light beam. In this example, the respective frequencies of the light beams may be available to frequency module 227. Based on the known frequencies, frequency module 227 may calculate a frequency coefficient that indicates a difference between the frequencies of the light beams. Frequency module 227 may then measure the reflected frequency of each corneal glint of the authentication images. Based on the reflected frequencies, frequency module 227 may calculate a "reflected frequency coefficient" that indicates the difference between the reflected frequencies. Frequency module 227 may then compare the frequency coefficient of the emitted light beams to the reflected frequency coefficient (e.g., by calculating a ratio). If the calculated ratio exceeds a preprogrammed threshold ratio, frequency module 227 may detect a spoofing attempt, and prevent one or more facial recognition programs running on computing device 200 from performing facial recognition analysis on the authentication image.

While optical properties such as color are described for purposes of example with respect to frequency of light, these optical properties may be discerned by other types of analysis on emitted and/or reflected light. For example, color may be discerned from an optical property known as wavelength. On this basis, a sub-spectrum of colors may be represented as a "wavelength range." Wavelength may be a mathematical inverse of frequency. More specifically, one may derive a wavelength from a known frequency value by dividing 1 by the frequency value. In this manner, a computing device may implement techniques of this disclosure in a variety of ways to discern qualities of corneal glint.

In some implementations, frequency module 227 may cause flashbulbs 216 to modulate the color of the emitted light beam(s). More specifically, frequency module 227 may cause flashbulbs 216 to vary the color of the emitted light beams. In turn, glint detection module 224 may compare the color of any detected corneal glint to the color of the corresponding light beam. Frequency module 227 may additionally cause flashbulbs 216 to emit a series of light beams, with varying colors in the series. Glint detection module 224 may then detect corneal glint corresponding each light beam of the series, and compare the color of each detected corneal glint with the corresponding light beam of the series. For example, glint detection module 224 may authenticate a user when the corneal glint is blue in response to an emitted blue light beam, red for an emitted red light beam, and so on. In this manner, computing device 200 and components thereof may implement techniques of this disclosure to more robustly and reliably detect possible spoofing attempts.

Figure 3:
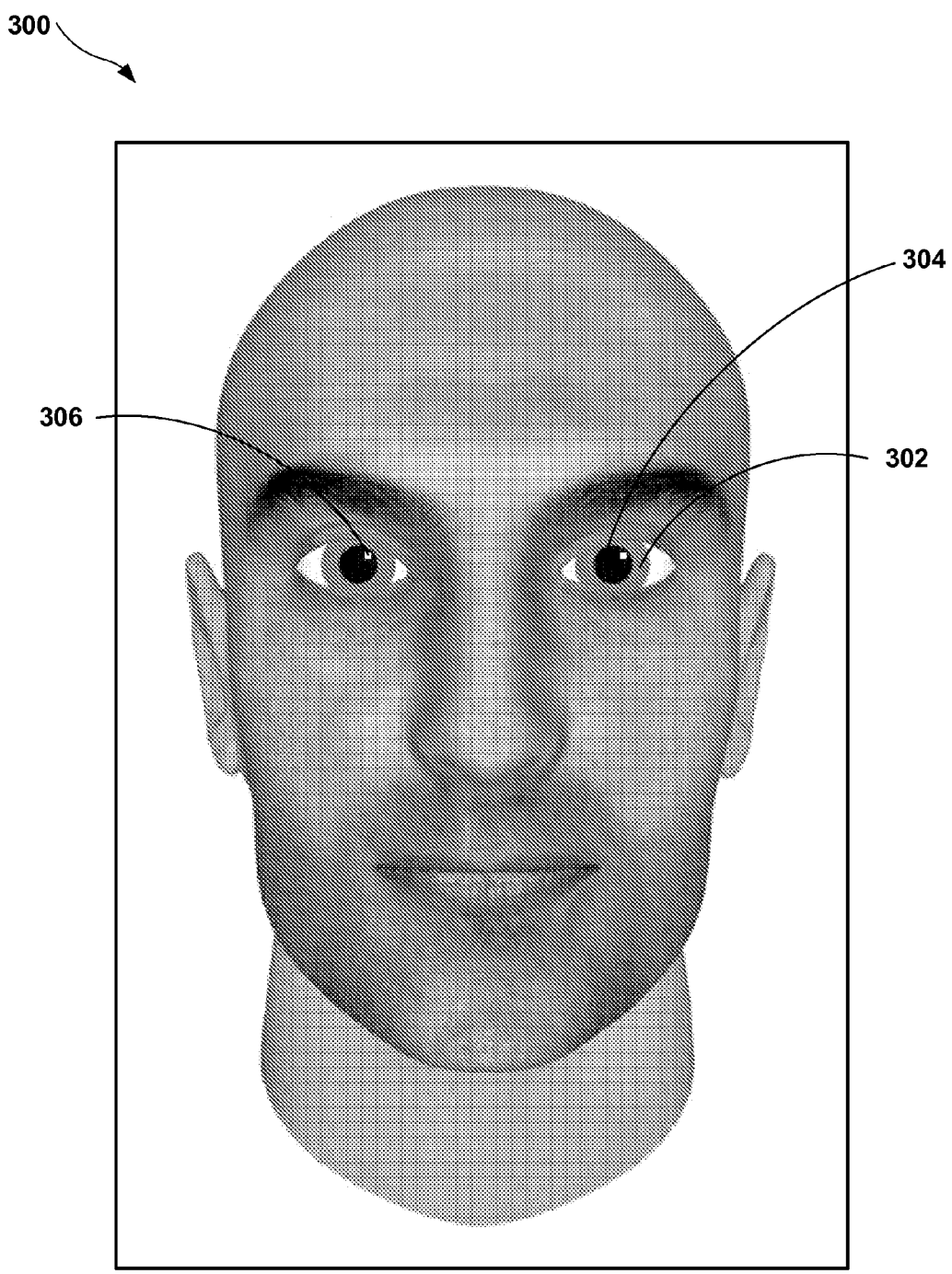
FIG. 3 is a conceptual diagram illustrating an example facial image that includes corneal glint identified by a computing device to detect possible spoofing in the facial image, in accordance with one or more aspects of this disclosure.

FIG. 3 is a conceptual diagram illustrating an example facial image that includes corneal glint identified by a computing device to detect possible spoofing in the facial image, in accordance with one or more aspects of this disclosure. Facial image 300 may be an example of an authentication image captured by a computing device such as computing devices 102 or 200, whether spoof-based or legitimate. A computing device may implement techniques of this disclosure to detect and analyze corneal glint 306, for determining whether facial image 300 is spoof-based or legitimate. For ease of illustration purposes only, FIG. 3 is discussed with respect to corneal glint 306 of a right eye of a subject of the facial image 300. In operation, a computing device in accordance with this disclosure may detect and analyze corneal glint 306, the corneal glint of the subject left eye, or both.

Similarly, FIG. 3 includes illustrations of certain facial elements, selected as non-limiting examples. More specifically, FIG. 3 illustrates iris 302 and pupil 304. As shown in FIG. 3, iris 302 and pupil 304 may provide a background against which light reflections, such as corneal glint 306 may be more clearly visible. In some examples, corneal glint 306 may include, be, or be part of a light reflection known as "catchlight" or "catch light." Catchlight may include a reflection of the surroundings of the cornea, particularly in situations where the surroundings are brightly lit. The nature of iris 302 and/or pupil 304 may reflect light and images placed in brightly lit environments, causing the phenomenon of catchlight.

As discussed, a computing device in accordance with this disclosure may detect a presence of corneal glint 306 in facial image 300 to determine whether facial image 300 is legitimate or spoof-based. In some examples, the computing device may determine that facial image 300 is legitimate based solely on the presence of corneal glint 306. In other examples, the computing device may analyze corneal glint 306, and use one or more analyzed qualities or characteristics of corneal glint 306 to determine whether facial image 300 is legitimate or spoof-based.

In some examples, the computing device may analyze two or more reflective intensities of corneal glint 306 to determine whether facial image 300 is legitimate or spoof-based. For example, the computing device may capture two different facial images. Each facial image may be associated with a light beam of varying intensity. For example, while capturing the first facial image, the computing device may emit a flash having high intensity. While capturing the second facial image, however, the computing device may emit a flash having low intensity.

Based on the known intensities, the computing device may calculate an intensity coefficient that indicates a difference between the intensities of the emitted flashes. The computing device may then measure the reflected intensity of corneal glint 306 in each facial image. Based on the reflected intensities, the computing device may calculate a "reflected intensity coefficient" that indicates the difference between the reflected intensities. The computing device may then compare the intensity coefficient of the emitted flashes to the reflected intensity coefficient (e.g., by calculating a ratio). If the calculated ratio exceeds or otherwise differs from a preprogrammed threshold ratio, the computing device may detect a spoofing attempt, and prevent one or more facial recognition programs running on the computing device from performing facial recognition analysis on the authentication image. In this example, the first facial image may serve as a "reference facial image" against which the computing device may compare the second facial image.

Figure 4:
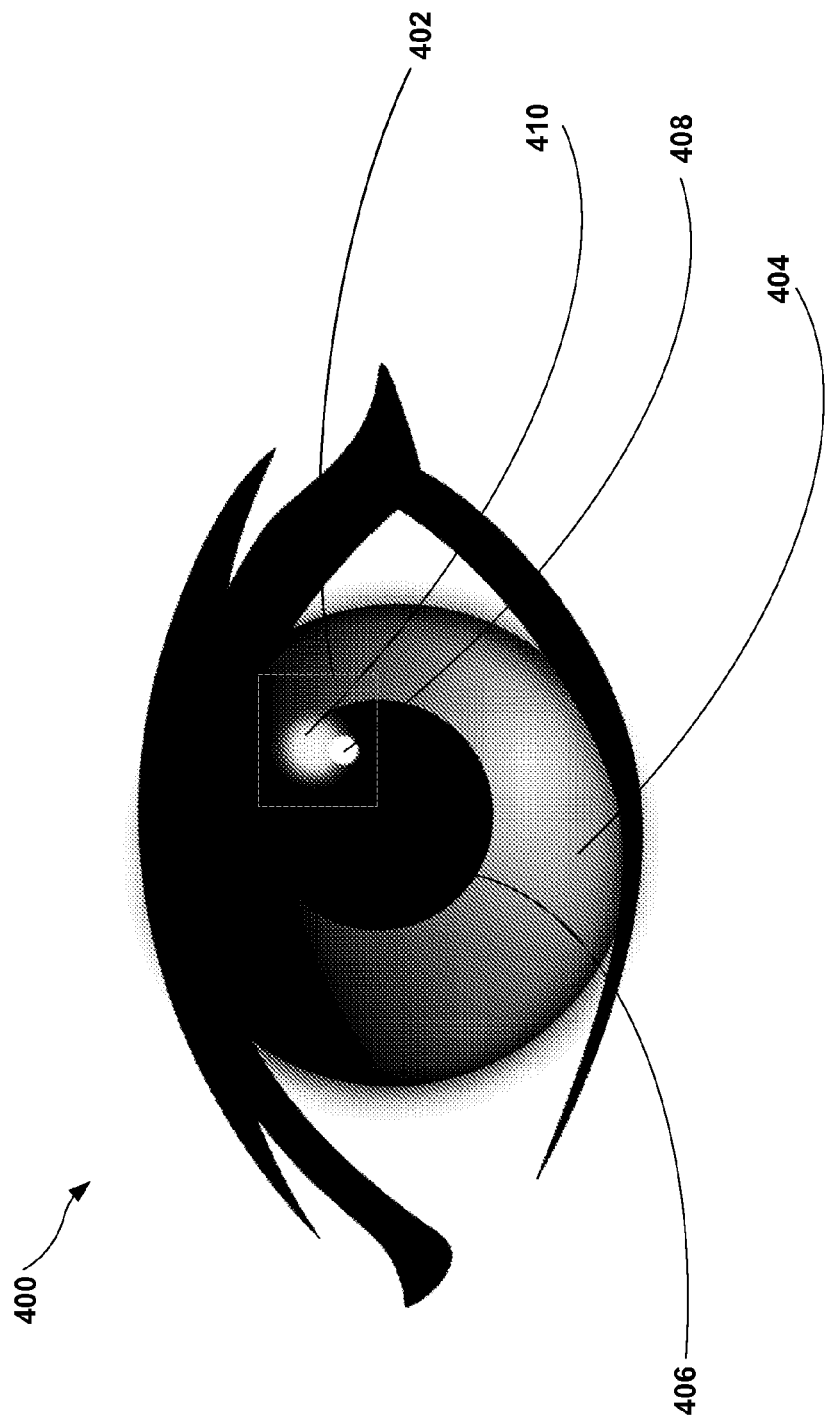
FIG. 4 is a conceptual diagram illustrating an example image of an eye that includes corneal glint identified by a computing device to detect possible spoofing in a facial image, in accordance with one or more aspects of this disclosure.

FIG. 4 is a conceptual diagram illustrating an example image of an eye that includes corneal glint identified by a computing device to detect possible spoofing in a facial image, in accordance with one or more aspects of this disclosure. FIG. 4 illustrates a close-up view of eye 400, which includes iris 404 and pupil 406. Portions of iris 404 and pupil 406 include corneal glint 402. As discussed, corneal glint 402 may be caused by natural and/or human-made light sources in the vicinity of eye 400, may be induced by an emission of a light beam, or any combination thereof.

In the example of FIG. 4, corneal glint 402 includes two portions, namely, a sharp lower portion 408 and a blurred upper portion 410. In some instances, blurred upper portion 410 may represent a common phenomenon known as a "specular highlight." Specular highlights may occur due to the curvature of eye 400, brightness of the light surrounding eye 400, proximity of eye 400 to a light source, and various other factors. In some examples, a computing device may implement techniques of this disclosure to identify a legitimate facial image based on the presence of a specular highlight. As discussed, a common reason for specular highlights is the curvature of eye 400, and thus, photographs used for spoofing may fail to generate a specular highlight. In this manner, techniques of this disclosure may utilize the phenomenon of specular highlights to detect suspected spoofing attempts.

In other examples, blurred upper portion 410 of corneal glint 402 may be a reflection caused by an object other than eye 400, such as a lens of eyeglasses. In some examples where a user wears eyeglasses, blurred upper portion 410 of corneal glint 402 may be separated from the sharper bottom portion of corneal glint 402. A computing device implementing techniques of this disclosure may recognize one or both portions of corneal glint 402 to identify a legitimate facial image. In this manner, techniques of this disclosure may allow authentication by an authorized user even in cases where the corneal glint is distorted by a user's need to wear eyeglasses.

Figure 5:
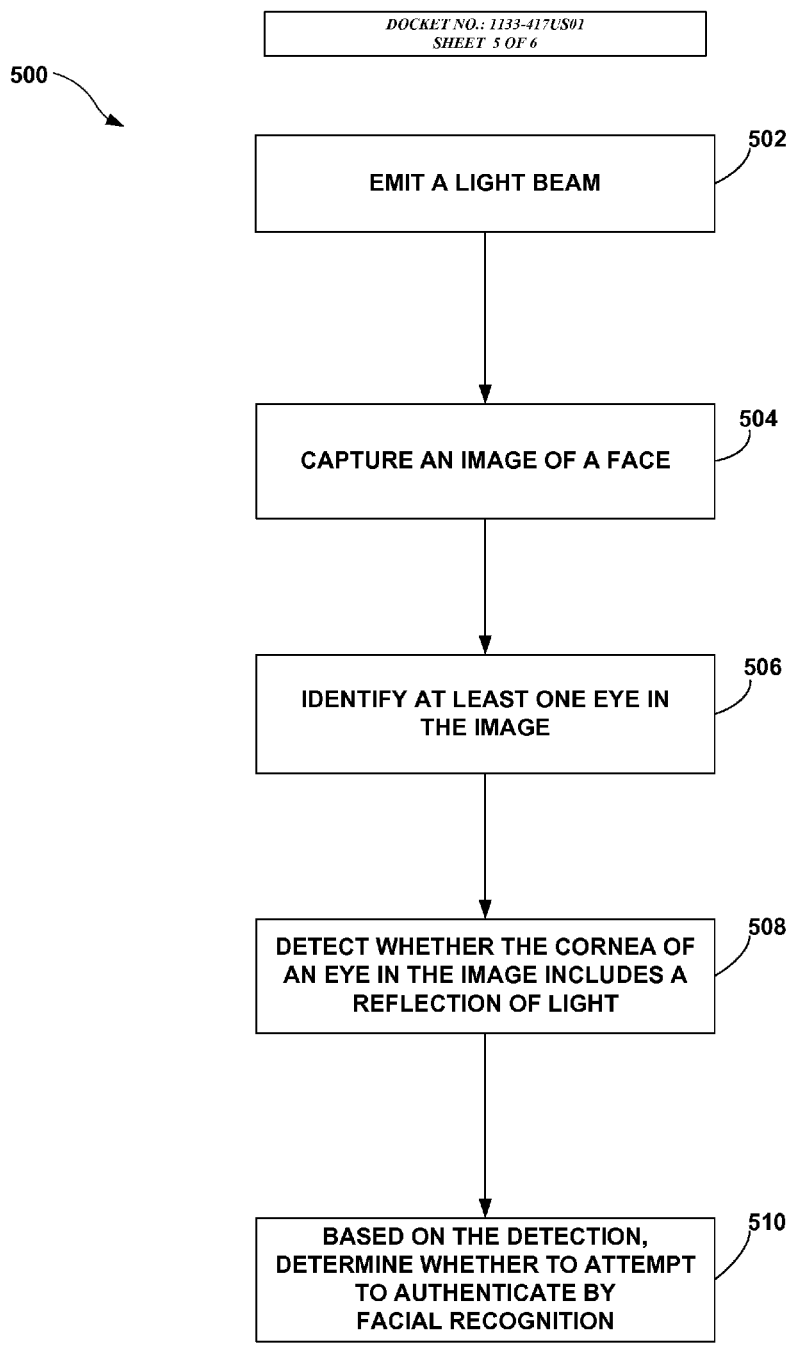
FIG. 5 is a flowchart illustrating an example process that may be performed by a computing device to detect possible spoofing in a captured facial image, in accordance with one or more aspects of this disclosure.

FIG. 5 is a flowchart illustrating an example process that may be performed by a computing device to detect possible spoofing in a captured facial image, in accordance with one or more aspects of this disclosure. Process 500 may begin when a computing device initiates an emission of a light beam (502). As discussed, in accordance with this disclosure, an example of a light beam may be a flash emitted by a flashbulb of, or coupled to, the computing device. The computing device captures an image of a face (504). The image may, in some instances, be an authentication image for purposes of authentication by facial recognition.

In the example of FIG. 5, the computing device identifies at least one eye in the captured facial image (506), and the computing device detects whether the cornea includes a reflection of light (508). More specifically, the cornea may form the front-facing, exposed portion of at least one eye identified in the captured facial image. Additionally, the reflection may be associated with the emitted light beam, and may include, be, or be part of a corneal glint.

Based on the success of the detection, the computing device determines whether to attempt to authenticate by facial recognition (510). More specifically, if the computing device does not detect the reflection of light, the computing device may not run one or more facial recognition programs on the captured facial image. Conversely, if the computing device successfully detects the reflection of light, the computing device may run one or more facial recognition programs on the captured facial image. Based on whether or not the facial recognition programs discern a match between the captured facial image and at least one stored enrollment image, the computing device may grant or deny authentication, respectively.

Figure 6:
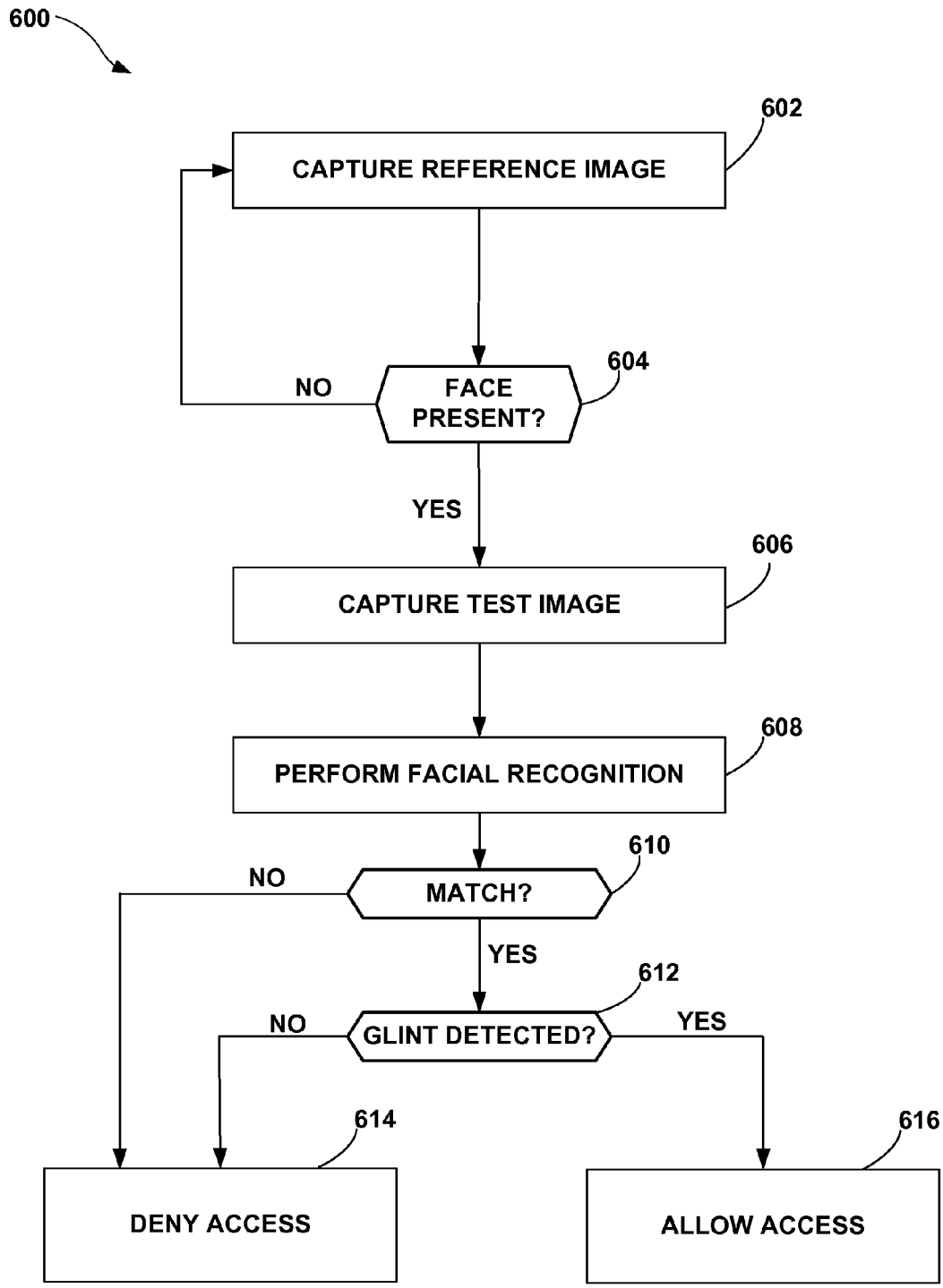
FIG. 6 is a flowchart illustrating an example process that may be performed by a computing device to detect possible spoofing in a captured facial image, in accordance with one or more aspects of this disclosure.

FIG. 6 is a flowchart illustrating an example process that may be performed by a computing device to detect possible spoofing in a captured facial image, in accordance with one or more aspects of this disclosure. Process 600 is only one example operation of a computing device in accordance with the present disclosure. In general, a computing device may implement process 600 to check for corneal glint, after one or more facial recognition programs assess an authentication image.

Process 602 may begin when the computing device captures a reference image (602). In some instances, the computing device may deactivate a light source, such as a flashbulb, a display-based light source, etc. before capturing the reference image. The computing device may then detect whether or not a representation of a human face is present in the reference image (604). If no face is present in the reference image, the computing device may capture the reference image again, either automatically, or by prompting a user to submit another reference image.

If the computing device successfully detects the face in the reference image, the computing device may capture a test image (606). At the time of capturing the test image, the computing device may activate one or more light sources, such as a flashbulb, a display-based light source, etc. The computing device may then perform facial recognition on the test image (608). More specifically, facial recognition programs running on the computing device may compare the test image to one or more enrollment images stored on the computing device. Based on the comparison, the computing device may determine whether or not grant the test image a match for facial recognition purposes (610). If the test image does not qualify for a facial recognition match, the computing device may deny access to one or more functionalities controlled by the computing device (614).

On the other hand, if the test image does qualify for a facial recognition match, the computing device may attempt to detect a corneal glint in the test image (612). The computing device may use either objective or subjective approaches to detecting the corneal glint. In an example objective approach, the computing device may analyze the test image alone. In an example subjective approach, the computing device may detect the corneal glint by comparing the test image to the reference image.

As discussed, the computing device may capture the reference image with light source(s) deactivated. However, the computing device may capture the test image while one or more light sources are activated. As a result, the computing device may induce corneal glint in the test image (if the test image is a legitimate facial image), but not in the reference image. If test image displays sufficient corneal glint when compared to the reference image, the computing device may detect corneal glint for purposes of step 612.

Based on the outcome of the corneal glint detection, the computing device may take various actions. If the computing device successfully detects the corneal glint, the computing device may allow access to functionalities controlled by the computing device based on facial recognition authentication (616). Based on the facial recognition match (610) and the corneal glint detection (616), the computing device may determine that the test image is a legitimate facial image, and not spoof-based. However, if the computing device fails to detect the corneal glint, the computing device may deny access by facial recognition authentication (614). Based on the failure to detect corneal glint, the computing device may determine that the test image is spoof-based, and thus prevent erroneous authentication by spoofing.

While the steps of process 600 are described in a particular order for purposes of example, a device may implement the steps in varying orders in accordance with one or more aspects of this disclosure. In some examples, the device may perform glint detection and facial recognition concurrently (or substantially concurrently). For example, the device may commence both glint detection and facial recognition at the same time, or commence one while the other is still in progress. In other examples, the device may perform glint detection before facial recognition, and vice-versa. In examples where the device performs glint detection after performing facial recognition, the device may deny authentication based on insufficient glint irrespective of the results of the facial recognition. In this manner, techniques of this disclosure may be implemented in various orders to achieve the anti-spoofing goals described herein.

While described largely with respect to unlocking a computing device for purposes of example, techniques of this disclosure may be implemented in various scenarios. In some instances, a computing device in accordance with this disclosure may control functionalities of another device, such as a door lock. In these examples, the facial recognition programs may cause the door lock to transition from locked to unlocked state, communicating the facial recognition match using a network interface or other communication channel. Such door locks may be used in various practical scenarios, such as to control access to safeboxes containing valuable data and documents, automobiles, or storage areas used for controlled substances, such as in a medical facility. In such examples, the computing device may implement techniques of this disclosure to detect spoofing attempts and prevent erroneous authentication by facial recognition in potentially sensitive situations.

Additionally, techniques of this disclosure may be applied in the form of blink detection. A device implementing the techniques may perform blink detection either in place of glint detection or as a supplement to glint detection. In one implementation, the device may emit a light beam in the form of a bright flash. The device may cause the flash to be sufficiently bright to cause a user to blink involuntarily. The device may detect the blink (one or both eyes closed either fully or partially) in at least one captured authentication image. In other implementations, the device may display a message instructing the user to blink within a particular time frame. In one such implementation, the device may capture multiple authentication images, and verify that the user blinked in an authentication image corresponding to the time when (s)he was instructed to blink. In another such implementation, the device may capture a single authentication image, and verify that the captured image includes an indication of a blink. When implemented in addition to glint detection techniques described herein, blink detection may add reliability and robustness. When implemented in a standalone fashion, blink detection may provide an alternate anti-spoofing measure by verifying that a captured image is that of a responsive user rather than a static picture or pre-recorded video of the user. In this manner, techniques of this disclosure may include the use of blink detection to perform and/or enhance anti-spoofing measures described herein.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

While described with respect to computing devices that use facial recognition technologies, techniques of this disclosure may be implemented by computing devices that use other types of biometric authentication as well. For example, the techniques may be implemented by computing devices that use other types of recognition-based technologies (e.g., technologies for recognizing a user's body characteristics of, etc.), touch-free fingerprint recognition, and others.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. Additional examples of computer readable medium include computer-readable storage devices, computer-readable memory, and tangible computer-readable medium. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:
1. A method comprising:
initiating an emission, by a computing device, of at least one light beam;
receiving, from an image capture device coupled to the computing device, an image of a face;
identifying at least one representation of an eye in the image of the face;
determining, by the computing device, whether at least one reflection of light from the light beam is associated with the representation of the eye in the image of the face; and
determining, based at least in part on whether the at least one reflection of light from the light beam is associated with the representation of the eye in the image of the face, whether to deny authentication of a user with respect to accessing one or more functionalities controlled by the computing device.

2. The method of claim 1, wherein the at least one reflection of light includes a glint reflected by a cornea of the representation of the eye in the image of the face.

3. The method of claim 1, wherein determining whether to deny authentication of the user comprises determining whether to deny authentication of the user prior to performing facial recognition based at least in part on the image of the face.

4. The method of claim 3,
responsive to determining that the at least one reflection of light from the light beam is not associated with the representation of the eye of the user in the image of the face:
  denying authentication of the user with respect to accessing one or more functionalities controlled by the computing device; and
  determining not to perform facial recognition on the image of the face.

5. The method of claim 1, further comprising:
performing, by the computing device, facial recognition based at least in part on the image of the face,
wherein determining whether to deny authentication of the user comprises determining whether to deny authentication of the user substantially concurrently with performing facial recognition based at least in part on the image of the face.

6. The method of claim 1, further comprising:
performing, by the computing device, facial recognition based at least in part on the image of the face, wherein performing the facial recognition based at least in part on the image of the face produces one or more results, and
wherein determining whether to deny authentication of the user comprises determining whether to deny authentication of the user after performing the facial recognition based at least in part on the image of the face and irrespective of the one or more results of performing the facial recognition.

7. The method of claim 1, further comprising:
receiving, from the image capture device, a reference facial image prior to initiating the emission; and
identifying at least one reference representation of an eye in the reference facial image.

8. The method of claim 7, further comprising:
comparing the at least one reflection of light to a reference reflection of light in the reference facial image, wherein the reference reflection of light is associated with the at least one reference representation of the eye in the reference facial image.

9. The method of claim 1, further comprising:
terminating the emission; and
receiving, from the image capture device, a reference facial image after terminating the emission.

10. The method of claim 1, wherein determining whether to deny authentication of the user further comprises:
  when an intensity of the at least one reflection of light is less than a threshold intensity, denying authentication of the user with respect to accessing one or more functionalities controlled by the computing device.

11. The method of claim 10, further comprising:
notifying the user that access to the computing device is denied.

12. The method of claim 1, wherein determining whether to deny authentication of the user comprises:
  determining an expected frequency range having an upper bound and a lower bound; and
  when a frequency associated with the at least one reflection of light is greater than the upper bound or less than the lower bound of the expected frequency range, denying authentication of the user with respect to accessing one or more functionalities controlled by the computing device.

13. The method of claim 1, further comprising:
initiating a second emission, by the computing device, of at least a second light beam having a second intensity, wherein the at least one light beam of the emission has a first intensity, and wherein the first intensity and the second intensity differ by an emitted intensity coefficient.

14. The method of claim 13, wherein the image of the face comprises at least a first image of the face, the method further comprising:
  receiving, from the image capture device, a second image of the face, the second image associated with the second emission; and
  comparing a first reflective intensity associated with the first image of the face to a second reflective intensity associated with the second image of the face.

15. The method of claim 14, wherein determining whether to deny authentication of the user comprises:
  calculating a reflective intensity coefficient based on a difference between the first reflective intensity and the second reflective intensity;
  obtaining an intensity ratio at least in part by comparing the reflective intensity coefficient to the emitted intensity coefficient; and
  when the intensity ratio is greater than a threshold ratio, denying authentication of the user with respect to accessing one or more functionalities controlled by the computing device.

16. The method of claim 1, further comprising:
initiating a second emission, by the computing device, of at least a second light beam having a second frequency, wherein the at least one light beam of the emission has a first frequency, and wherein the first frequency and the second frequency differ by an emitted frequency coefficient.

17. The method of claim 16, wherein the image of the face comprises at least a first image of the face, the method further comprising:
  receiving, from the image capture device, a second image of the face, the second image associated with the second emission; and
  comparing a first reflected frequency associated with the first image of the face and a second reflected frequency associated with the second image of the face.

18. The method of claim 17, wherein determining whether to deny authentication of the user comprises:
  calculating a reflected frequency coefficient based on a difference between the first reflected frequency and the second reflected frequency;
  obtaining a frequency ratio at least in part by comparing the reflected frequency coefficient to the emitted frequency coefficient; and
  when the frequency ratio is greater than a threshold ratio, denying authentication of the user with respect to accessing one or more functionalities controlled by the computing device.

19. The method of claim 1, further comprising:
upon detecting that the at least one reflection of light does not exist in the image of the face;
  determining not to compare the image of the face to the enrollment image; and
  preventing a device communicatively coupled to the computing device from transitioning from a locked state to an unlocked state.

20. The method of claim 19, wherein the device communicatively coupled to the computing device is a door lock.

21. The method of claim 1, wherein determining whether to deny authentication of the user comprises:
  determining an expected wavelength range having an upper bound and a lower bound; and when a wavelength associated with the at least one reflection of light is greater than the upper bound or less than the lower bound, denying authentication of the user with respect to accessing one or more functionalities controlled by the computing device.

22. A computer-readable storage device encoded with instructions that, when executed, cause at least one programmable processor of a computing device to perform operations including:
  initiating an emission of at least one light beam;
  receiving, from an image capture device coupled to the computing device, an image of a face of a user;
  identifying at least one representation of an eye of the user in the image of the face;
  detecting whether at least one reflection of light associated with the light beam exists in the image of the face, wherein the at least one reflection of light is associated with the at least one representation of the eye; and
  determining, based at least in part on the detecting, whether to deny authentication of the user with respect to accessing one or more functionalities controlled by the computing device.

23. A device comprising:
  at least one processor;
  at least one image capture device operable to capture an image of a face;
  a light source operable to initiate an emission of at least one light beam
  a glint detection module operable to identify at least one representation of an eye of the user in the image of the face, and determine whether at least one reflection of light from the light beam is associated with the representation of the eye of the user in the image of the face; and
  a facial recognition module operable to determine whether to deny authentication of the user with respect to accessing one or more functionalities controlled by the computing device.

24. The device of claim 23, wherein the device is selected from a group consisting of: a mobile phone, a tablet computer, a laptop computer, a netbook, a personal digital assistant, a biometric door lock, a desktop computer, a set-top box, a television, a vehicle ignition system, and a presence verification device.

25. The device of claim 23, wherein the glint detection module is further operable to:
  receive, from the image capture device, a reference facial image prior to the light source initiating the emission; and
  identify at least one reference representation of an eye in the reference facial image.

26. The device of claim 25, wherein the glint detection module is further operable to:
  compare the at least one reflection of light to a reference reflection of light in the reference facial image, wherein the reference reflection of light is associated with the at least one reference representation of the eye in the reference facial image.

27. The device of claim 23, wherein the glint detection module is further operable to:
  when an intensity of the at least one reflection of light is less than a threshold intensity, deny authentication of the user with respect to accessing one or more functionalities controlled by the computing device.

28. The device of claim 23, wherein the light source is further operable to initiate a second emission of at least a second light beam having a second intensity, wherein the at least one light beam of the emission has a first intensity, and wherein the first intensity and the second intensity differ by an emitted intensity coefficient.

29. The device of claim 28, wherein the captured image of the face comprises at least a first image of the face, and wherein the glint detection module is further operable to:
  receive, from the image capture device, a second image of the face, the second image of the face associated with the second emission; and
  compare a first reflective intensity associated with the first image of the face to a second reflective intensity associated with the second image of the face.

30. The device of claim 29, wherein the facial recognition module is further operable to:
  calculate a reflective intensity coefficient based on a difference between the first reflective intensity and the second reflective intensity;
  obtain an intensity ratio at least in part by comparing the reflective intensity coefficient to the emitted intensity coefficient; and
  when the intensity ratio is greater than a threshold ratio, deny authentication of the user with respect to accessing one or more functionalities controlled by the computing device.

* * * * *